May 9, 1967     S. SIMONETTI     3,318,580
MIXING APPARATUS
Filed May 8, 1964     2 Sheets-Sheet 1
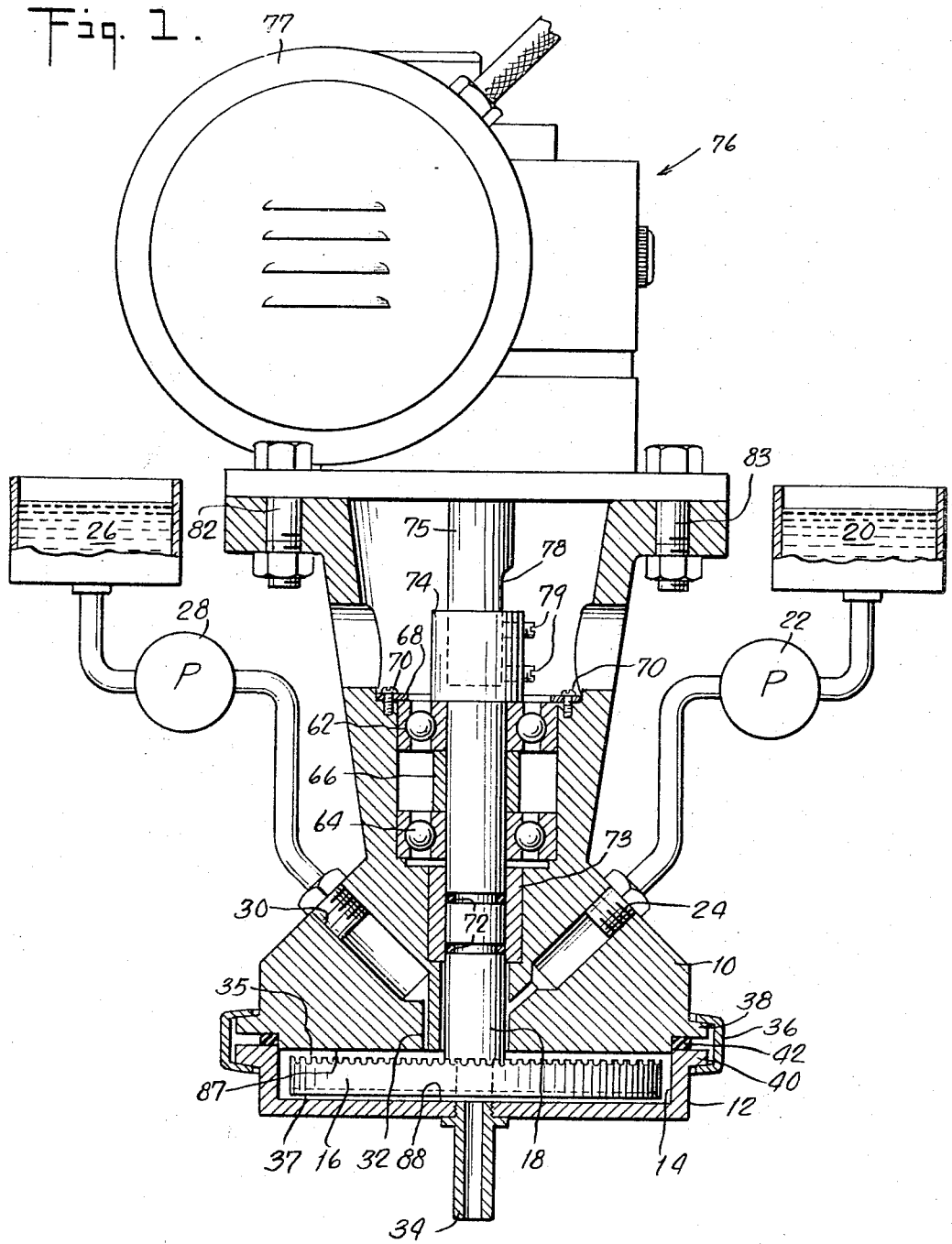
INVENTOR.
SERGIO SIMONETTI
BY
Thomas F. Moran
ATTORNEY May 9, 1967  S. SIMONETTI  3,318,580
MIXING APPARATUS
Filed May 8, 1964  2 Sheets-Sheet 2
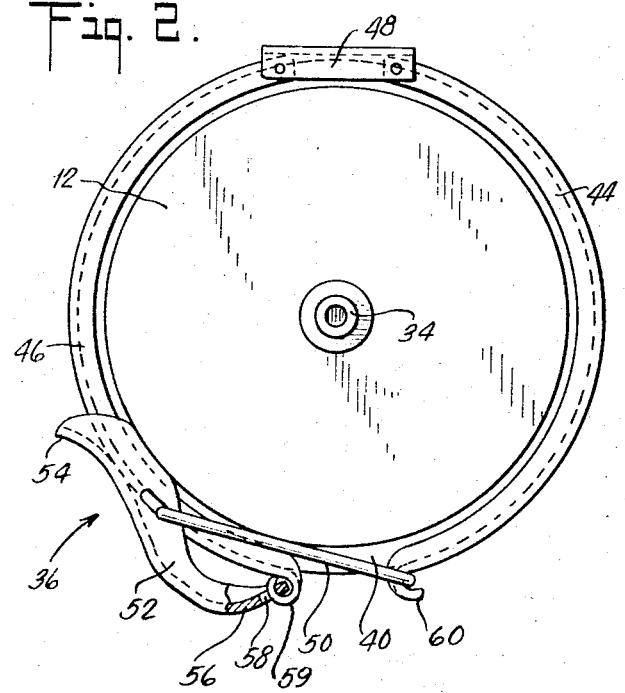
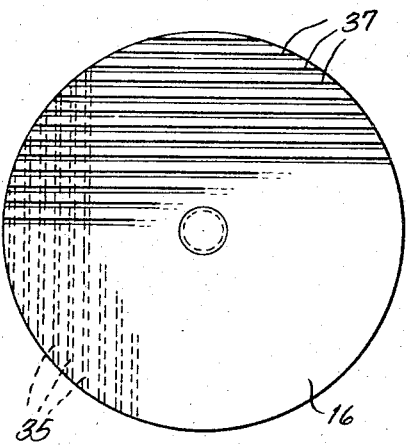
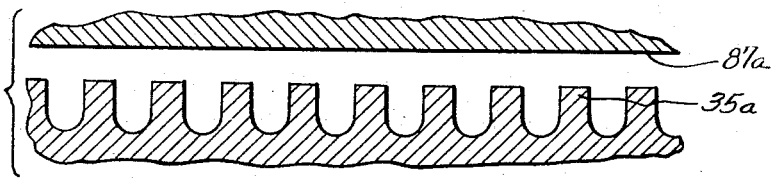
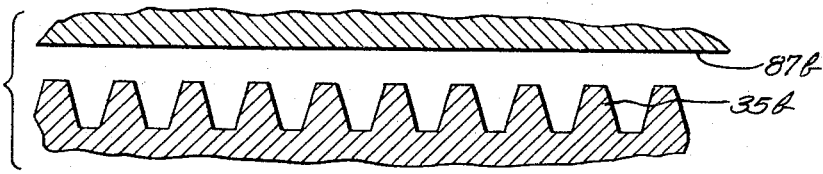
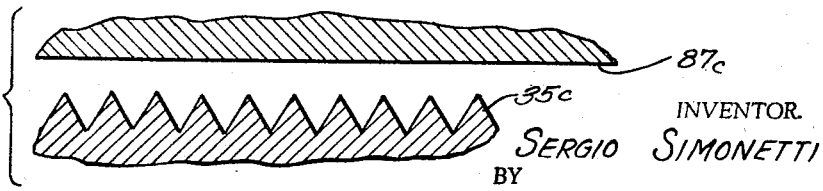
INVENTOR.
SERGIO SIMONETTI
BY
Thomas F. Moran
ATTORNEY United States Patent Office 3,318,580
Patented May 9, 1967

3,318,580
MIXING APPARATUS
Sergio Simonetti, Stamford, Conn., assignor to Sonic Engineering Corporation, Norwalk, Conn., a corporation of Connecticut
Filed May 8, 1964, Ser. No. 366,071
14 Claims. (Cl. 259—8)

This invention relates to apparatus useful for mixing two or more liquids and/or slurries.

When viscous liquids and/or slurries must be mixed, serious problems are often encountered in accomplishing the mixing because large amounts of energy must be applied and although the liquids may be perfectly miscible, the intimate mixing of such liquids is difficult simply because of the high viscosities of the liquids. Furthermore, in either batch mixers or in continuous mixers, the mixing of very viscous liquids generally involves difficulties and waste because of the fact that the surfaces of the apparatus in contact with the liquids take up and retain a large volume of the liquids which cannot be considered as output. The retention of a large amount of material in the mixer reduces the efficiency of the mixing operation and greatly aggravates the problem of cleaning the mixing apparatus when that is necessary.

Accordingly, it is one object of the present invention to provide mixing apparatus for viscous liquids which has improved efficiency.

It is another object of the present invention to provide apparatus for mixing viscous liquids with an important improvement in efficiency in terms of a high volume of output in relation to the total area of the mixing surfaces of the apparatus in contact with the liquids to be mixed.

Another object of the present invention is to provide for very thorough mixing of two or more very viscous liquids while maintaining a relatively short path for the liquid through the mixer.

The above mentioned problems are seriously aggravated and the above mentioned objectives assume much greater importance and significance when the viscous liquids which are to be mixed are mutually reactive liquids, and particularly when the nature of the reaction is such as to cause the mixed liquids to form a solid. There are many examples of this type of reaction particularly among the so-called thermosetting resinous materials. One outstanding class of examples of thermosetting resinous materials which have very high utility and which often involve very viscous liquids are the epoxy resins. The epoxy resins as a class are particularly noted for their high degree of utility, particularly for their adhesive properties and for the strength and toughness of the hardened product. The most commonly available epoxy resins are formed as the reaction products of epichlorohydrin and bis-phenol A. These epoxy resins are highly reactive with many other resins and hardener materials.

In many instances, it is most convenient to employ thermosetting resin mixtures having a relatively short pot life in order to achieve high speed production rates. By this, it is meant that once the reactive components are mixed together, the period during which they can be left together in the mixing vessel before they harden is quite limited. The use of a short pot life mixture presents tremendous problems in the design, construction and operation of the mixing apparatus in order to avoid having the thermosetting mixture "set up" and harden within the mixing apparatus. This problem is particularly serious with the epoxy resins because they are so adhesive, and so tough once they have hardened.

Accordingly, another object of the present invention is to provide mixing apparatus which is capable of mixing high viscous mutually reactive liquids which constitute thermosetting mixtures with a short pot life.

Another object of the invention is to provide improved apparatus for mixing thermosetting liquids with a short pot life in which the requirements for use of the thermosetting mixture may be intermittent in nature.

Another object of the invention is to provide apparatus for thoroughly mixing thermosetting mixtures on a continuous rather than a batch basis.

Another object of the invention is to provide apparatus which is particularly well adapted for thoroughly mixing viscous reactive liquids forming thermosetting mixtures and which is particularly characterized by the fact that the mixing chamber of the apparatus thoroughly purges itself of old material by displacement with new material so that the old material does not remain to harden within portions of the mixing apparatus.

Another object of the invention is to provide a mixer for two or more materials forming a thermosetting mixture which is particularly characterized by ease of cleaning.

Another object of the invention is to provide an improved continuous mixer for thermosetting compositions which is characterized by rapid disassembly features and relatively small surface areas in contact with the mixture to facilitate rapidity and ease of cleaning.

Another object of the invention is to provide a continuous mixing apparatus for liquid materials forming thermosetting compositions which is particularly characterized by economy and simplicity in manufacture.

Another object of the invention is to provide a system for mixing and delivering viscous liquids forming thermosetting compositions in which the mixing and delivering are combined in essentially a single operation of a continuous nature, but in which the mixing and delivery may be interrupted as necessary to provide for intermittent mixture delivery requirements.

Other objects and advantages will be apparent from the following description and the accompanying drawings which are briefly described as follows:

FIGURE 1 is a front view, partially in section, illustrating a preferred embodiment of the present invention.

FIGURE 2 is a bottom view of a portion of the apparatus in FIGURE 1.

FIGURE 3 is a bottom view of the mixing wheel element of the apparatus of FIGURE 1.

FIGURES 4a, 4b and 4c are enlarged sectional detail views illustrating various useful modifications of the configurations of the mixing surfaces.

In carrying out the objects of the invention in one preferred embodiment of mixing apparatus there is provided a housing defining a cylindrical chamber having inlet openings for different liquids at different radial spacings and including an outlet opening for the mixture. A mixing member is mounted for rotation in the chamber and has at least one end surface arranged in spaced cooperative relationship with a surface of the chamber. At least one of the surfaces is provided with spaced, substantially parallel transverse ridges.

Referring more particularly to FIGURE 1, which illustrates a preferred embodiment of the present invention, the apparatus illustrated there may be generally described as including a housing 10 including a housing end cover 12, and defining a mixing chamber 14. A wheel 16 is arranged for rotation upon a shaft 18 within the chamber 14.

One of the liquids to be mixed is pumped from a reservoir 20 by means of a pump 22 into an inlet opening 24 in the housing 10 which communicates with mixing chamber 14 by means of a clearance space along the shaft 18. Another liquid to be mixed with the first liquid is pumped from a reservoir 26 by means of a pump 28 into a second opening 30 in the housing 10, and which communicates with the mixing chamber 14 by means of an extension of passage 30, as indicated at 32 which is radially spaced outwardly from the shaft 18 (which constitutes the point of inlet of the first liquid). The liquids are mixed as they are pumped through the chamber 14 and the resulting mixture is emitted from a chamber outlet provided in the housing at an outlet tube 34.

Both end surfaces of the mixing wheel 16 are provided with grooves which thereby form ridges 35 and 37 on the surfaces. If desired, ridges parallel or intersecting with respect to the axis of the wheel, may also be provided on the edge surfaces thereof. These ridges are generally substantially parallel and transverse to the axis of the wheel. However, the set of ridges 35 on the upper end surface are at an angle with respect to the ridges 37 on the lower end surface. This angle is preferably ninety degrees. These ridges will be described more fully below in connection with FIGURES 3 and 4a, 4b and 4c.

The structure shown in FIGURE 1 will now be described in greater detail. The end cover portion 12 of the housing 10 is preferably held in assembled relationship with the main body of the housing 10 by means of a clamp 36 which surrounds the housing. The clamp 36 is formed with a U-shaped cross section to embrace flanges 38 and 40 respectively provided on the main body and on the end cover 12 of the housing 10. A sealing ring 42 is provided at the joint between the end cover 12 and the main body of the housing 10. The clamp 36 is preferably constructed to be quickly assembled and disassembled by means of a latching lever mechanism similar to that commonly used for instance to latch trunks. The details of the preferred structure for this clamp 36 are shown in FIGURE 2.

FIGURE 2 is a bottom end view of the apparatus of FIGURE 1. It shows the details of the structure of clamp 36 and illustrates the operation thereof. Clamp 36 includes two clamping legs 44 and 46 which are each pivotally connected to a common yoke member 48. To one end of the leg 44 three is pivotally connected a link 50, as by a curved hook 60 at the end of the leg. A locking lever 52 is pivotally connected to the other end of the link 50. One end 54 of the locking lever 52 is shaped to form a handle, and the other end 56, which is shorter, is formed with an opening at 58. The leg 46 is terminated in an outwardly curved hook at 59 which is proportioned so that the lever end 56 may be fitted over the hook 59, with the hook 59 fitting into the aperture 58. The leg 46 may then be tightened up by moving the lever end 54 outwardly and away from the leg 44. By continuing the rotation of the lever 52 in a generally clockwise direction, the clamp 36 is completely locked and tightened when the lever is completely folded over on the outside of leg 46.

Referring back to FIGURE 1, the outlet tube 34 is provided with screw threads at its upper end by means of which it is fastened to the center of the end cover 12. The wheel 16 is provided with a threaded central aperture by means of which it is fastened on the threaded end of shaft 18. The direction of the screw threads at this connection is chosen so that the force exerted by the shaft 18 in rotating the wheel is in a direction to tighten the screw thread connection. Otherwise, there would be a tendency for the wheel to loosen, and to become detached from the shaft 18.

The shaft 18 is supported for rotation upon conventional roller bearings 62 and 64 which are positioned within the housing 10 by means of a spacer 66 and a retaining ring 68 which is held in place by screws 70. The space around the lower end of the shaft 18, which is in communication with the inlet opening 24, is sealed off by means of conventional O-ring seals 72 which cooperate with a bushing member 73 to keep the liquid from the inlet 24 away from the bearings 62 and 64.

The upper end of the shaft 18 is provided with an enlarged end portion 74, the lower edge of which engages with the inner race of the bearing 62 to provide for a transfer of thrust forces from the shaft 18 to the bearing 62. The enlarged shaft portion 74 also forms a means of coupling shaft 18 to a shaft 75 of a drive unit 76. The shaft 75 is provided with an end portion having a "flat" formed thereon at 78. The portion 74 of shaft 18 is formed with an end opening to receive the end shaft 75, and is provided with set screws 79 to engage with the flat 78.

The drive unit 76 includes an electric motor 77 which is coupled through a conventional gear drive, such as a worm gear drive, to the shaft 75. Since the component of drive unit 76 are conventional, and subject to variations, they are not shown in detail. The housing 10 is assembled to the housing of drive unit 76, and supported thereon, by means of the bolts 82 and 83.

It will be appreciated from the features of construction just shown and described that the housing 10 and its associated apparatus may be completely removed from the drive unit 76 by simply disconnecting the bolts 82 and 83, loosening the set screws 79, and lowering the housing 10 and the associated apparatus away from the drive mechanism. This feature is particularly valuable if the entire housing must be thoroughly disassembled for cleaning or if a new housing must be substituted for an old one. Although the two bolts 82 and 83 may be sufficient to attach the housing 10 to the drive unit 76, it is preferred that four or more of such bolts be circumferentially spaced around the edges of the mating flanges of the unit 76 and the housing 10.

It is an unusual and valuable feature of the present invention that the apparatus may be employed for intermittent delivery of mixed reactive liquids from the outlet 34. For instance, a thin stream of mixed reactive liquid may be delivered from the outlet 34 to provide a ribbon of adhesive in production assembly operations where the mixture is a thermosetting adhesive material. The ribbon of adhesive may be applied in the required length to a particular part, and then the operation of the apparatus may be discontinued momentarily until the next part is in position to receive its ribbon of adhesive. This may be accomplished simply by starting and stopping the drive motor 77, and by concurrently starting and stopping the pumps 22 and 28 for the respective liquid constituents of the mixture. For this purpose, it is possible to arrange the apparatus of FIGURE 1 with a single drive motor to drive both of the pumps 22 and 28, and to also drive the mechanism 76. When a production run is ended or when the epoxy materials from the mixing apparatus are not required for a period of time which will exceed the pot life of the material, then the apparatus is purged by continuing the operation of the motor 77 and the pumps 22 and 28 but introducing solvents through the pumps and into both of the inlets 24 and 30 rather than the reactive liquids. Suitable valves leading to solvent reservoirs are provided in the system for this purpose. However, they are omitted from the drawings for purposes of simplicity and clarity. Although the apparatus shown within the housing 10 is illustrated in detail the pumps 22 and 28 are shown in schematic form only since they may be of conventional construction.

It is one of the features of the present invention that it is capable of efficiently handling and mixing thermosetting resin liquid compositions having an extremely short pot life, and in which the constituent liquids as well as the mixed liquids have very high viscosity. For instances, with apparatus as illustrated in FIGURE 1, it is possible to provide a one to one by volume mixture of any epoxy resin and a catalyst having a pot life of only fifteen minutes at 70° F., and in which the liquids have viscosities in the range 15,000–85,000 centipoises, more or less, for the resin, and in the range 5,000–85,000 centipoises, more or less, for the catalyst. These viscosity values are those measured on a Brookfield viscosimeter with a No. 5 spindle at 10 to 20 r.p.m. at 77° F. The weight of the resin is 12 to 15 pounds per gallon and the weight of the catalyst is 12 to 14 pounds per gallon. With materials having the above characteristics, it is possible, with apparatus as illustrated in FIGURE 1, to obtain a thorough mixture with an output of as much as 18 cubic inches per minute. This mixing rate is remarkable when it is appreciated that it is achieved with a mixing wheel 16 having an outside diameter of only three inches and with the other dimensions of the apparatus in proportion to this dimension as illustrated in FIGURE 1. It is one of the important features of this invention that a high volume of output is available from the apparatus in proportion to the total area of surfaces of the apparatus which are exposed to the resins which are being mixed and in proportion to the volume of the mixing chamber.

The rapid and thorough mixing operation of the viscous liquids, despite the fact that the liquids being mixed form a composition which is very reactive and has a relatively short pot life, is successfully achievable partly because the apparatus is constructed in such a way as to be completely self purging. By this it is meant that the new resin and resin mixtures entering the apparatus completely displace the old resins and the old resin mixtures so that no reactive mixtures are permitted to remain in the apparatus long enough to solidify and build up a solid residue.

Furthermore, the success is also due to the peculiar features of construction including the transverse ridges 35 and 37 on the end faces of the mixing wheel 16. Ridges 35 and 37 are generally equally spaced and parallel on each face. However, the set of ridges on the upper face is generally not parallel with the set of ridges 37 on the lower face. They are at a substanial minimum angle to one another, and preferably at a minimum angle of 90°.

Another important feature of the structure as shown in FIGURE 1 is that the end surface 87 of the chamber 14, which is opposite to the ridges 35, is preferably spaced from the tops of ridges 35 by a dimension in the range from about twenty thousandths to about twenty-five thousandths of an inch. Similarly, the lower face 88 of the chamber 14 preferably has a similar narrow spacing from the tops of the ridges 37.

The spacing between the end surfaces of the chamber 14 and the end surfaces of the wheel 16 containing the ridges 35 and 37 are obviously quite small considering the high viscosity of the liquids being mixed. These spacings are generally smaller than the normal film thickness of the viscous liquids which are to be mixed. Accordingly, the apparatus provides a rather extreme "working" of these liquids which achieves the intimate mixing.

The grooves in the end faces of the wheel 16 which form the ridges 35 and 37 are approximately equal in their dimension of depth to the spacing dimension just discussed above. In other words, the ridges 35 and 37 each have a height in the neighborhood of twenty-five thousandths of an inch.

FIGURE 3 is a bottom view of the wheel 16 as it appears when disassembled from the apparatus of FIGURE 1. In this view, some of the ridges 37 are shown in full, since they are on the bottom face of the wheel 16, and some of the ridges 35 are shown dotted since they appear on the opposite side of the wheel.

It is to be observed that a characteristic of the cooperating mixing surface is that one of the surfaces is provided with ridges, such as 35, and the other surface is substantially smooth. While this embodiment illustrates the provision of all the ridges 35 and 37 upon the faces of the wheel 16, it will be appreciated that similar results may be obtained by providing the smooth surfaces upon the wheel, and the ridged surfaces on the inner walls of the housing 10. It is obviously possible also to provide one ridged surface on the housing and one ridged surface on the wheel 16. However, for ease and economy in manufacture, and for excellent results, it is preferred that the ridges 35 and 37 should be provided upon the faces of the wheel 16.

FIGURES 4a, 4b and 4c illustrate various shapes which the ridges, such as 35 and 37 may take. The precise shape of these ridges is not critical. However, for ease in cleaning of the wheel 16, it is preferred that the bottoms of the grooves between the ridges should be smooth curves, as illustrated in FIGURE 4a. For ease in identifying the relationship between the parts shown in FIGURES 4a, b and c with the corresponding parts previously illustrated in the other figures, the ridges in FIGURES 4a, b and c are respectively lettered 35a, b and c, and the cooperating mixing surfaces are respectively labelled 87a, b and c.

From the above explanations, it is apparent that the clearances between the tops of the ridges 35 or 37 and the cooperating surface, such as 87, are small in relation to the viscosity of the liquids which are to be mixed. Furthermore, the ridges provide successive passages of greater constriction through which the liquids must be passed in the mixing process. This action of passing the liquids through areas of greater and lesser constriction, together with the relative movement between the ridges and the cooperating surfaces is somehow very effective to accomplish an intimate mixture of the liquids in a very small mixing chamber.

It is one of the important features of the invention that not only does the mixing chamber involve a very minimum surface area exposed to the liquids being mixed, but also the volume of mixed and partially mixed liquids retained within the chamber around the wheel 16 is very limited in relation to the mixer output rate. This feature is particularly important in the mixing of thermosetting liquid compositions, and particularly where an intermittent output of the mixed liquids is desired.

While FIGURE 3 illustrates the ridges 35 and 37 on the end faces of the wheel 16 as being perfectly straight and uniform in spacing, and parallel to one another, it will be understood that variations in the pattern of ridges are possible without departing from the spirit of the invention. For instance, the ridges may have a slightly curved configuration and they may form patterns which resemble an hourglass with the ridges which cross the face at the greatest distance from the center having the greatest curvature. Also, the face having the ridges may be divided into sectors separated by radii, and the ridge pattern may be different in each of the different sectors. For instance, in each sector, the ridges may be aligned perpendicular to one of the radii forming the boundary of the sector. However, in the preferred form of the invention, the ridges are uniformly spaced and straight and mutually parallel to one another arranged transversely across the surface upon which they appear.

While it has not been emphasized above, it is evident from the drawings that one of the features and advantages of this invention is a balance of forces on the wheel 16. This is important because the forces are great due to the high viscosity of the liquids and the small clearances within the mixing chamber. Specifically, because the end surfaces of the wheel 16 are the active mixing surfaces having the small clearances, the axial forces on these two faces of the wheel 16 are essentially balanced so that there is very little net thrust upon wheel 16 and its bearings 62 and 64. Similarly, it is evident that the radial forces on the wheel 16 are balanced. Thus, the wheel 16 is mainly stressed only in rotational torsion.

While other variations and modifications of the present invention will occur to those who are skilled in the art, it is intended that the following claims shall cover the entire valid scope of this invention and shall include such variations and modifications.

I claim:

1. Apparatus useful for mixing viscous liquids comprising a housing defining a cylindrical chamber having inlet openings for different liquids, said housing including an outlet opening from said chamber, a mixing member mounted for rotation within said chamber and having at least one end surface arranged in spaced cooperative relationship with a surface of said chamber, at least one of said surfaces being provided with spaced transverse ridges all of which are substantially straight line and parallel.

2. A mixing apparatus for at least two liquids comprising a housing defining a cylindrical chamber and having inlet openings for said liquids, said housing including an outlet opening, a wheel mounted for rotation within said chamber and having end surfaces spaced in cooperative relationship respectively with end surfaces of said chamber, at least one of each pair of said cooperative surfaces being provided with spaced transverse ridges all of which are substantially straight line and parallel, said ridges having a height which is substantially equal to the spacing from the tops of said ridges to the adjacent cooperative surface.

3. A mixing apparatus useful for mixing at least two viscouse liquids comprising a housing defining a cylindrical chamber and having inlet openings for said liquids at different radial spacings at one end of said chamber, said housing including an outlet opening at an opposite end of said chamber, a wheel mounted for rotation within said chamber and having end surfaces spaced in cooperative relationship respectively with the end surfaces of said chamber, the end surfaces of said wheel being provided with spaced transverse ridges all of which are substantially straight line and parallel.

4. Apparatus useful for mixing viscous liquids comprising a housing defining a cylindrical chamber having inlet openings for different liquids, said housing including an outlet opening from said chamber, a mixing member mounted for rotation within said chamber and having at least one end surface arranged in spaced cooperative relationship with a surface of said chamber, at least one of said surfaces being provided with spaced transverse ridges all of which are substantially straight line and parallel, the tops of said ridges having a spacing in the neighborhood of 0.025 inch from the cooperative adjacent surface.

5. Mixing apparatus useful for mixing at least two viscous liquids comprising a housing defining a cylindrical chamber having a short length and having inlet openings at different radial spacings at one end of said chamber, said housing including an outlet opening at an opposite end of said chamber, a wheel mounted for rotation within said chamber and having end surfaces spaced in cooperative relationship respectively with the end surfaces of said chamber, said wheel end surfaces each being provided with spaced substantially parallel transverse ridges, the ridges on one of said surfaces being arranged at a substantial angle to the ridges on the other one of said surfaces.

6. A mixing apparatus useful for the rapid mixing of at least two viscous liquids comprising a housing enclosing a cylindrical mixing chamber, a mixing wheel positioned within said chamber for rotation therein, said wheel including a supporting shaft, and said housing including an opening communicating with said chamber for receiving said supporting shaft, said housing including an inlet opening in communicating relationship with said shaft opening for the introduction of a first liquid at the shaft and through said shaft opening to said mixing chamber, said housing including at least one other liquid inlet opening communicating with said mixing chamber on the same side of said mixing chamber as said shaft opening, said housing including a discharge opening for the mixed liquids centrally arranged on the side of said chamber opposite to said shaft opening, each end surface of said mixing wheel and the respectively juxtaposed surface of said housing forming an inner wall of said chamber comprising a pair of cooperative mixing surfaces, at least one of said surfaces of each pair being provided with transverse ridges all of which are substantially straight line and parallel.

7. Apparatus in accordance with claim 6, wherein each of said end surfaces of said wheel is provided with transverse ridges.

8. Mixing apparatus useful for mixing viscous liquid materials and the like, comprising a housing enclosing a cylindrical mixing chamber, a mixing wheel positioned within said chamber for rotation therein, said wheel including a supporting shaft, and said housing including an opening communicating with said chamber for receiving said supporting shaft, said housing including an inlet opening for receiving a first one of said liquids, said inlet opening being in communicating relationship with said shaft opening so that the first liquid is introduced at the shaft and through said shaft opening to said mixing chamber, said housing including at least one other liquid inlet opening communicating with said mixing chamber on the same side of said mixing chamber as said shaft opening, said housing including a discharge opening centrally arranged on the side of said chamber opposite to said shaft opening, each end surface of said mixing wheel and the respectively juxtaposed surface of said housing forming an inner wall of said chamber comprising pairs of cooperative mixing surfaces, said wheel end surfaces each being provided with transverse ridges, all of which are substantially straight line and parallel, said housing including a removable end cover for defining said chamber and clamping means for fastening said end cover to the main body of said housing.

9. Apparatus in accordance with claim 8 wherein said clamping means comprises a quick-disconnect clamp.

10. A cylindrical mixing wheel adapted for rotation about its axis provided with axial end surfaces, one of said surfaces being provided with spaced, transverse ridges all of which are substantially straight line and parallel.

11. A cylindrical mixing wheel adapted for rotation about its axis provided with axial end surfaces, each of said surfaces being provided with spaced, transverse ridges all of which are substantially straight line and parallel.

12. A mixing apparatus useful for the rapid mixing of at least two viscous liquids comprising a housing enclosing a cylindrical mixing chamber, a mixing wheel positioned within said chamber for rotation therein, said wheel including a supporting shaft, and said housing including an opening communicating with said chamber for receiving said supporting shaft, said housing including an inlet opening in communicating reltaionship with said shaft opening for the introduction of a first liquid at the shaft and through said shaft opening to said mixing chamber, said housing including at least one other liquid inlet opening communicating with said mixture chamber on the same side of said mixture chamber as said shaft opening, said housing including a discharge opening for the mixed liquids centrally arranged on the side of said chamber opposite to said shaft opening, each end surface of said mixing wheel and the respectively juxtaposed surface of said housing forming an inner wall of said chamber comprising a pair of cooperative mixing surfaces, at least one of said surfaces of each pair being provided with transverse ridges, said ridges being substantially straight and parallel and uniformly spaced.

13. A cylindrical mixing wheel adapted for rotation about its axis provided with axial end surfaces, each of said surfaces being provided with spaced, substantially parallel transverse ridges, all of the ridges on each of said surfaces being substantially parallel, the ridges on one of said axial end surfaces being disposed at an intersecting angle with respect to the ridges on the other of said end surfaces.

14. A cylindrical mixing wheel in accordance with claim 13 wherein said angle is substantially 90°.

References Cited by the Examiner
UNITED STATES PATENTS

| | | | |
|---|---|---|---|
| 2,270,480 | 1/1942 | Seyfried | 259—134 |
| 2,645,464 | 7/1953 | Forbes | 259—9 |
| 2,695,246 | 11/1954 | Jurgensen et al. | 259—10 |
| 2,731,253 | 1/1956 | Spencer | 259—9 |
| 2,788,337 | 4/1957 | Preiswerk et al. | 259—8 X |
| 2,937,857 | 5/1960 | Thurman | 259—9 |
| 2,973,945 | 5/1961 | Schneider | 259—9 |
| 3,009,685 | 11/1961 | Rettig | 259—7 |
| 3,141,865 | 7/1964 | McEvoy | 259—8 X |
| 3,212,128 | 10/1965 | Carleson et al. | 259—7 X |

References Cited by the Applicant
UNITED STATES PATENTS

| | | |
|---|---|---|
| 1,393,632 | 10/1921 | Mitchell. |
| 1,540,853 | 6/1925 | Macfie. |
| 1,711,154 | 4/1929 | Michal. |
| 2,857,144 | 10/1958 | Gurley et al. |
| 2,970,817 | 2/1961 | Gurley. |

WALTER A. SCHEEL, *Primary Examiner.*

J. M. BELL, *Assistant Examiner.*